Figure 3:
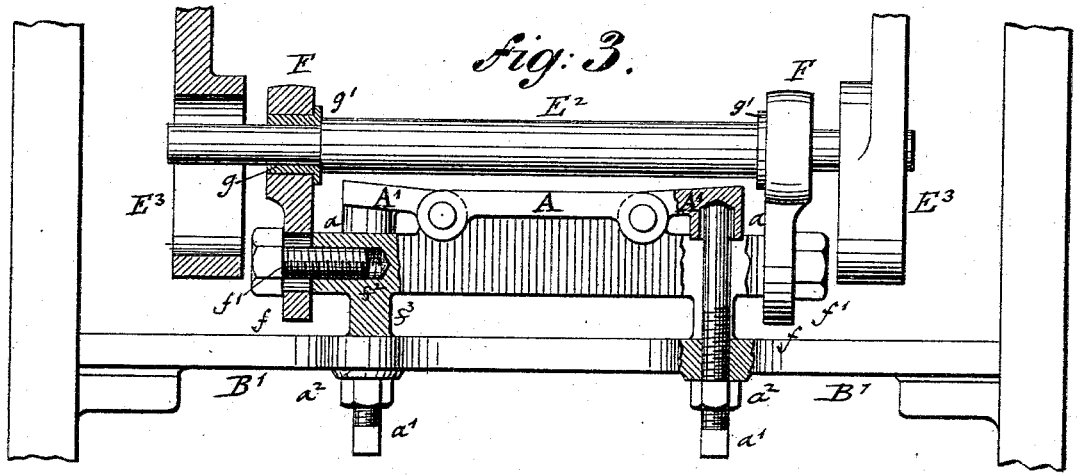
Figure 4:
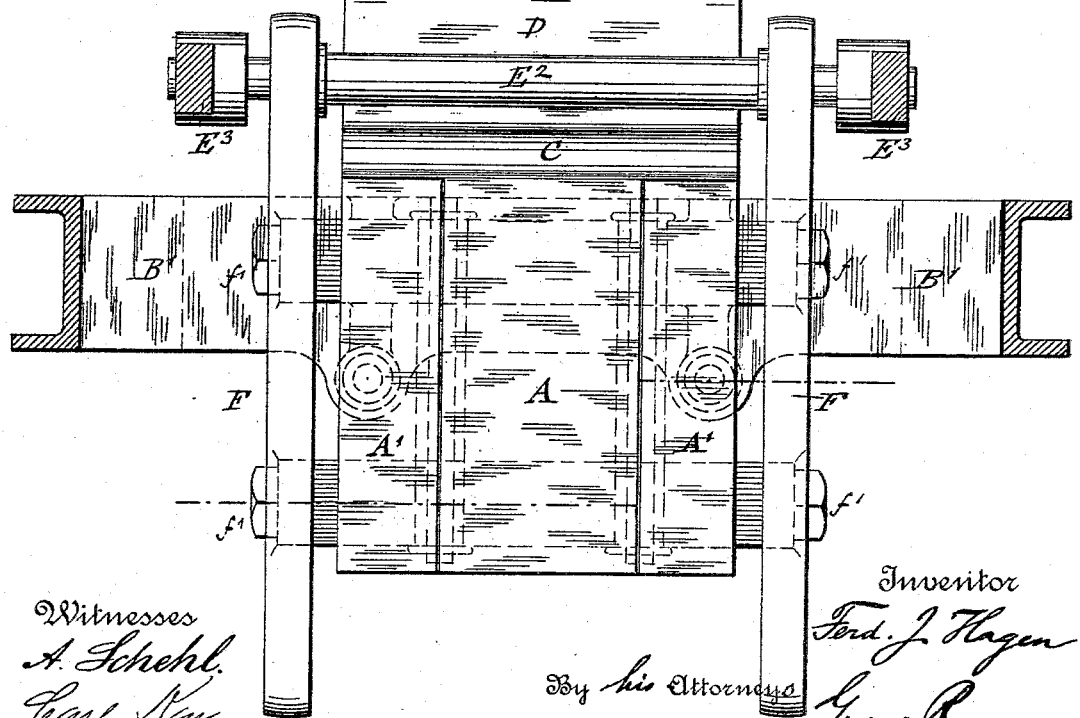
Figure 1:
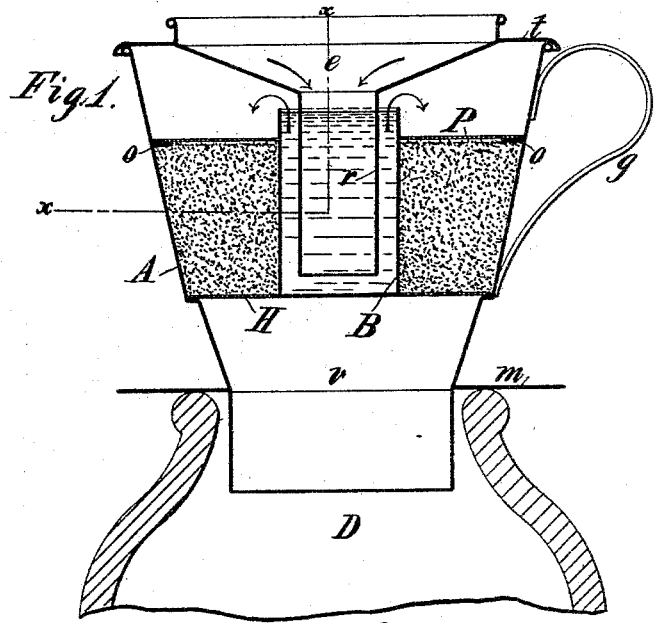
Figure 2:
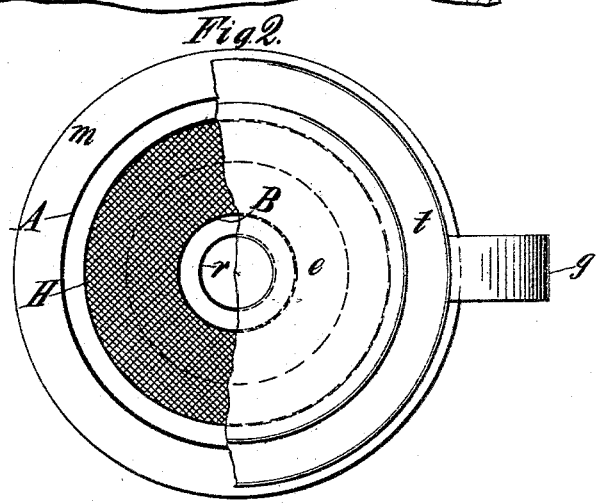
Figure 3:
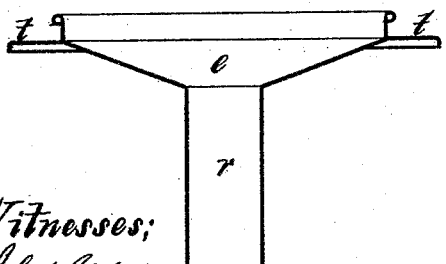
Figure 4:
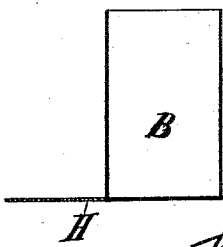

(No Model.) 2 Sheets—Sheet 2.

F. J. HAGEN.
CIGAR BUNCHING MACHINE.

No. 411,919. Patented Oct. 1, 1889.

Witnesses
A. Schehl
Carl Key

Inventor
Ferd. J. Hagen
By his Attorneys
Goepel & Raegener (No Model.)

C. HOEDER.
FUNNEL FOR PREPARING COFFEE.

No. 411,920. Patented Oct. 1, 1889.

Witnesses:
John Bicket
Kate E. Pembleton

Inventor:
Carl Hoeder
by attorneys
Brown & Griswold